July 2, 1963  F. G. PRIETO  3,096,042
JET SUSTAINED AND PROPELLED AIRCRAFT
Filed Oct. 1, 1954
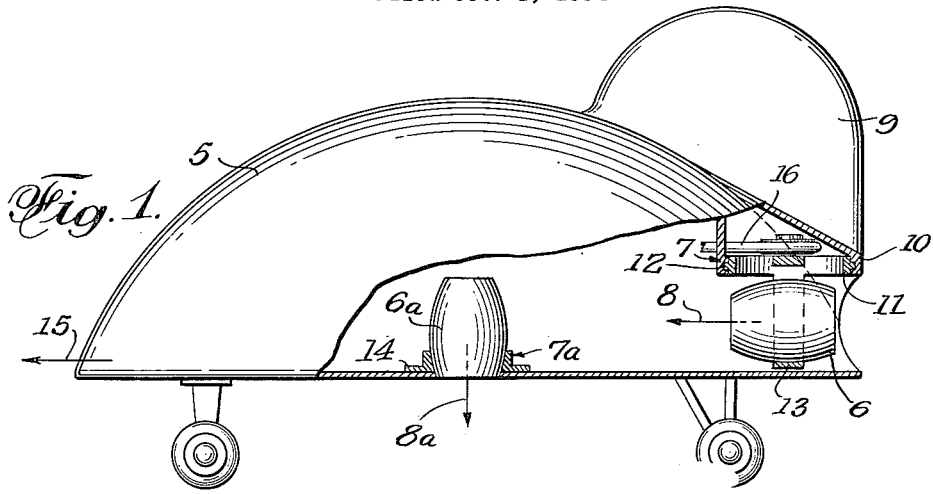
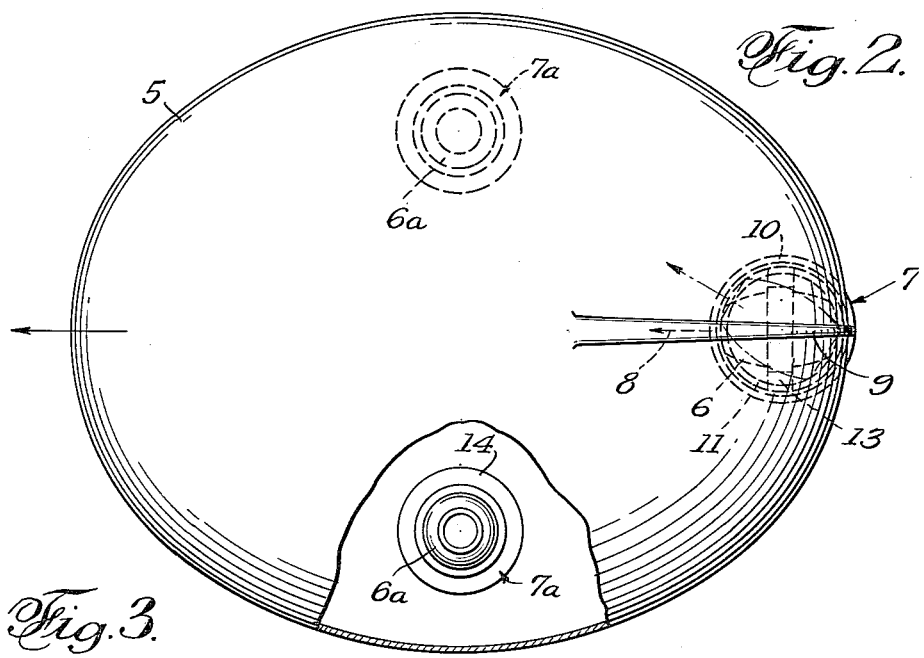
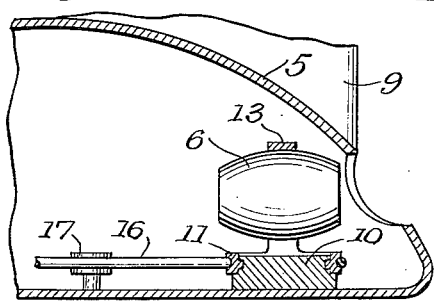
INVENTOR.
Fernando Prieto

United States Patent Office 3,096,042
Patented July 2, 1963

3,096,042
JET SUSTAINED AND PROPELLED AIRCRAFT
Fernando G. Prieto, Los Angeles, Calif.
(3a. Calle Poniente 904, San Salvador, El Salvador)
Filed Oct. 1, 1954, Ser. No. 459,625
2 Claims. (Cl. 244—12)

The present invention relates to improvements in flying vehicles and is a continuation-in-part of my pending application Serial No. 410,061, filed Feb. 15, 1054, now abandoned.

The wings of a conventional airplane, when the vehicle moves through the air, are constantly inclined to the forward line of flight in order to create a lifting force and overcome the pull of gravity. Said inclination, called the angle of attack, also produces a drag which reduces the speed of the vehicle and lessens its efficiency.

One object of the invention is to provide a combination of a vehicle and at least two reaction engines having independent and different action. The purpose of one or more engines is to vertically lift the vehicle while the purpose of the other one or more engines is to propel said vehicle in any desired direction transverse to the lift. That is, the vehicle is provided with engines having different purposes but both engines always cooperating to propel the vehicle with a minimum drag and a maximum efficiency.

Another object of the invention is to provide the vehicle of said combination with ability to quickly maneuver and/or change direction.

A further object of the invention is to obviate the need for complex apparatus such as wings and propellers which impede or prevent conventional vehicles attaining supersonic speeds.

The foregoing and other objects, features, and advantages of the invention will become more clearly evident from the following detailed description of an exemplary form of invention, the same being illustrated in the accompanying drawing, in which:

FIG. 1 is a side elevational view, partly in section, of one form of vehicle and propulsion means according to the invention.

FIG. 2 is a top plan view, partly broken away, and shown in section.

FIG. 3 is a fragmentary sectional view of another form of the invention, the same showing a modified form of vehicle propelling means.

In the drawing, FIGS. 1 and 2 show in combination a wingless vehicle 5 having reaction engines 6 and 6a and means 7 and 7a mounting said engines. The engines 6, 6a discharge through rear and bottom fuselage-provided wall openings, as shown.

The engines 6 and 6a are of any type of reaction engine that creates thrust along its axis 8 or 8a, as the case may be. Examples of such engines are jet motors and the engine disclosed in my Patent No. 2,481,672.

The vehicle shown is generally elliptical in plan has a substantially plane bottom wall and merging top and side walls which are convexly curved both transversely and longitudinally throughout the length and breadth of the vehicle. Thus the vehicle is easily maneuverable, produces little drag, and is adapted to be propelled in any desired direction. The substantially plane bottom of the vehicle functions in flight as do the wings of a wing type aircraft.

A vertical stabilizing fin 9 of substantial height is affixed to the top body wall of the vehicle, at the rear thereof, substantially as shown. The location of the tail fin 9 above the forward-propelling and steering engine 6 and just rearwardly of the plane of the left engines 6a is important in that it cooperates with the former to make predeterminedly controlled steering possible; and with the latter to facilitate even substantially vertical ascent and descent of the vehicle.

When engine 6 is operating and its longitudinal axis 8 is not parallel to the longitudinal axis 15 of the vehicle, the latter will turn around a vertical line through its center, and said rotation will last until parallelism is effected between said axes.

The means 7 in FIGS. 1 and 2 includes a circular and horizontal trackway 10 fixedly mounted on the vehicle as a reinforcement for adjacent top and side wall areas; and also includes a circular member 11 tracking in said trackway and adapted to revolve in a horizontal plane. Said trackway and said member are so interconnected, at 12, as to retain member 11 against vertical displacement from said trackway, and yet enable free rotational adjustment of member 11 by any suitable control means. Trackway 10 takes the form of a depending circular top and side wall area reinforcing flange whose lower edge terminates at approximately the plane of the uppermost portion of the rear fuselage opening so as not to interfere with engine 6 discharge. FIG. 2 shows the rear fuselage opening as being of much greater widthwise area than the discharge end of engine 6.

As shown, the engine 6 is placed within the vehicle 5 and affixed to member 11 as by suitable connection 13. Said engine 6 and means 7 may be disposed at any position where the thrust of the engine is effective to propel the vehicle forward.

The forms of the invention that are illustrated are substantially similar, except for arrangement. In FIG. 3, the engine 6 and member 11 are inverted from the showing in FIG. 1.

The means 7 also comprises an operating member such as cable 16 that may be controlled by a steering wheel. Said cable may be guided as by pulleys 17 and trained either around member 11 or over a pulley affixed to said member.

The dot-dash line positions of engine 6 (FIG. 2) indicate examples of the multiplicity of positions the engine can take to direct the movement of the vehicle. In this respect, the showing in FIGS. 1 and 2 are similar.

The means 7a is represented by flange 14 which affixes the engine 6a preferably inside the vehicle at its lower wall. Said engine or engines are placed in a position with the axis 8a vertical, the head upward, and the mouth preferably flush with said lower wall.

When vehicle 5, once in the air, has attained a desired height, the engine or engines 6a may reduce its operational speed just sufficient to overcome the pull of gravity. The engine or engines 6 may then start operating at the desired flight speed of the vehicle. It is evident therefore, that the combined operation of both engines 6 and 6a may adjustably move the vehicle 5 universally, so as to propel the same in any desired direction.

Since the position of the vehicle, due to the present combination, is always horizontal, it is evident that its drag is reduced to a minimum and its efficiency maintained to a maximum.

It is also evident that the vehicle may be groundborne or water-borne as well as air-borne.

Since variations of the present combination may be made within the concept of the invention, I wish to reserve to myself all modifications thereof that may fall within the scope of the pending claims.

I claim:

1. In a wingless gas jet discharge engine-propelled heavier than air flying vehicle which is devoid of connection to subjacent ground or water when in flight, so as to be adapted for high speed flying at from low to high altitudes, said vehicle having walls providing a hollow fuselage which is substantially oval in top plan, said fuselage providing a substantially plane bottom wall and merging side and top walls which are convexly curved both transversely and longitudinally throughout their extent and the length of the fuselage, said fuselage having an interior and forwardly closed engine-receiving space at least in part provided by said top, bottom, and side fuselage walls; two first and one second gas discharge type reaction engines disposed entirely within said fuselage space, the two first engines in said space being located approximately midway the length of said fuselage and adjacent opposite sides of the latter; the bottom wall of said engine-receiving space constituting the bottom wall of said fuselage and provided with an opening extending therethrough adjacent each side, mounting means for each of said first engines carried by said bottom wall and surrounding the respective openings therein as a bottom fuselage wall reinforcement at the site of said openings, said first engines being disposed in a downwardly discharging and substantially vertical position and directing their reacting forces downwardly through said bottom wall openings, whereby to vertically lift or controlledly lower the vehicle for a landing, the second single gas discharge type reaction engine having a rearwardly directed gas discharge end and constituting the steering and forward propulsion means for said vehicle, said single second engine located adjacent the rear end of both the vehicle fuselage and engine-receiving space, said rear fuselage end having an opening therein communicating directly with said engine-receiving space, at least the top and side walls of said engine-providing space being imperforate when the vehicle is in flight, said rear fuselage opening being of substantially greater widthwise area than the gas discharge end of said second engine, a circular tracking within said space and affixed to one of the top and bottom walls as a reinforcement for same, a member on which said second engine is affixed and which member is revolubly engaged with said tracking to turn in a horizontal plane around its axis through any desired angle, the discharge end of said second engine being disposed with relation to said rear fuselage opening to direct its reaction force therethrough during all positions of operative adjustment thereof relative to said fixed trackway, an upstanding stabilizing fin fixedly carried by the upper exterior portion of said fuselage extending longitudinally of the latter above said second engine to a point adjacent the plane of the first two engines and being of substantial height as compared to fuselage depth, whereby to cooperate with the latter as an aid in predeterminedly controlling turning of the vehicle in flight, and said first and second engines cooperating to propel said vehicle in flight with a minimum drag and a maximum efficiency.

2. In a wingless gas jet discharge engine propelled, heavier than air flying vehicle which is devoid of connection to subjacent ground or water when in flight, so as to be adapted for high speed flying at from low to high altitudes, said vehicle providing a fuselage having an interior and forwardly closed engine-receiving space, at least one first gas discharge type reaction engine disposed in said fuselage space and in a position substantially forward of the rear end of said fuselage, means mounting said engine in a downwardly discharging and substantially vertical position entirely within said fuselage space to vertically lift or controllably lower the vehicle for a landing; said vehicle fuselage having a substantially plane bottom wall constituting the bottom wall of said space and provided with an opening therethrough, said first reaction engine being disposed to direct its reaction force downwardly through said opening to produce a vertical draft therethrough to produce said vertical lift, or a controlled slow descent; at least one second gas discharge type reaction engine for vehicle steering and forward propulsion purposes and also disposed entirely within said interior fuselage space but in a position adjacent the rear end of the vehicle fuselage, said rear fuselage end having an opening therein, at least the side, top and rear walls of the engine-providing space of said fuselage being substantially imperforate except for said aforementioned rear fuselage opening when the vehicle is in flight, and said rear fuselage opening being of substantially greater widthwise area than the gas discharge portion of said second engine; a circular fuselage wall area-reinforcing tracking affixed to said fuselage within and adjacent the rear of said space, a member on which said second engine is affixed and which is revolubly engaged with said tracking to turn in a horizontal plane around its axis through any desired angle, said second engine being disposed with relation to said rear fuselage opening to direct its reaction force therethrough during all positions of operative adjustment thereof relative to said fixed trackway, an upstanding stabilizing fin of substantial height as compared to fuselage depth and fixedly carried by the upper exterior central top wall portion of said fuselage, said fin extending longitudinally of the fuselage at a point above said second engine and terminating adjacent the plane of said first engine, whereby to cooperate with the latter as an aid in predeterminedly controlling turning of the vehicle in flight, and both said first and second engines cooperating to propel said vehicle in flight with a minimum drag and a maximum efficiency.

References Cited in the file of this patent

UNITED STATES PATENTS

| | | |
|---|---|---|
| 1,009,010 | Bajza | Nov. 14, 1911 |
| 1,838,354 | Bauer | Dec. 29, 1931 |
| 1,855,695 | Snyder | Apr. 26, 1932 |
| 1,895,518 | Peck | Jan. 31, 1933 |
| 1,921,043 | Roth | Aug. 8, 1933 |
| 2,062,018 | Wheeler | Nov. 24, 1936 |
| 2,499,401 | Madden | Mar. 7, 1950 |
| 2,610,005 | Price | Sept. 9, 1952 |
| 2,677,931 | Prieto | May 11, 1954 |
| 2,734,699 | Lippisch | Feb. 14, 1956 |

FOREIGN PATENTS

| | | |
|---|---|---|
| 930,751 | France | Aug. 25, 1947 |
| 975,981 | France | Oct. 17, 1950 |